No. 849,225. PATENTED APR. 2, 1907.
L. GANS.
APPARATUS FOR SEPARATING CHAFF FROM COFFEE.
APPLICATION FILED APR. 6, 1906.

Witnesses:—
Frank L. A. Graham
H. Mansfield

Inventor,
Louis Gans.
by Townsend Dyout Hackley & Wright
his atty.

UNITED STATES PATENT OFFICE.

LOUIS GANS, OF LOS ANGELES, CALIFORNIA.

APPARATUS FOR SEPARATING CHAFF FROM COFFEE.

No. 849,225.  Specification of Letters Patent.  Patented April 2, 1907.

Application filed April 6, 1906. Serial No. 310,243.

*To all whom it may concern:*

Be it known that I, LOUIS GANS, a citizen of the United States, residing at Los Angeles, county of Los Angeles, State of California, have invented a new and useful Apparatus for Separating Chaff from Coffee, of which the following is a specification.

This invention relates to an apparatus for separating chaff and dust from coffee; and the objects of the invention are to provide a simple and effective mechanism by which the dust or chaff in the coffee is removed from the coffee, the coffee being discharged at one point from the apparatus and the chaff being discharged at another point.

Another object is to provide for separating the varying sizes of the ground coffee.

Figure 1:
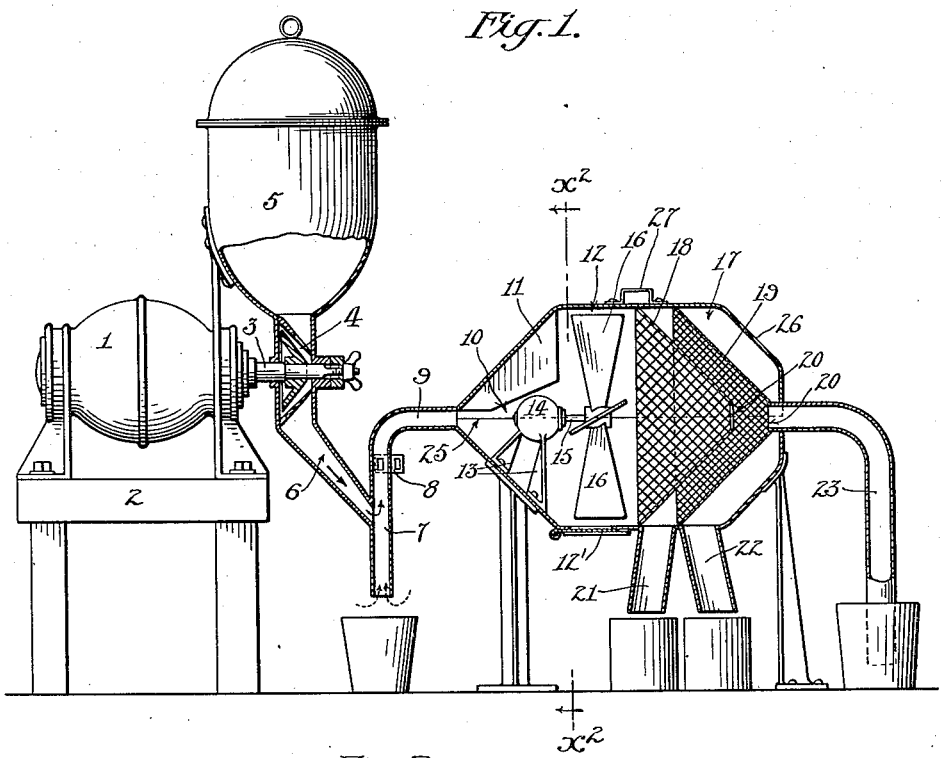
Figure 2:
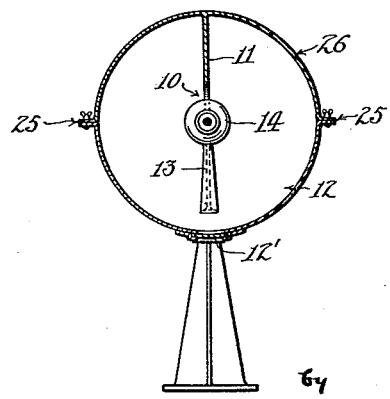

The accompanying drawings illustrate the invention, and, referring thereto, Figure 1 is a vertical longitudinal section taken through one form of apparatus, the mill-motor and part of the hopper of the mill being shown in elevation. Fig. 2 is a cross-section on the line $x^3$ $x^2$, Fig. 1.

1 designates an electric motor which is mounted on a suitable standard 2 and which has a shaft 3 for operating the coffee-mill 4. A hopper 5 is arranged above the mill, while a passage-way 6 leads from below the mill to a vertical passage 7. The passage 7 at a point slightly above the junction of the passage 6 is provided with a slide 8 for regulating the admission of air to the passage 7. The upper end of the passage 7 has a horizontal extension 9, which communicates with a conical separating-chamber 10, which is provided with an internal radial wing 11. Adjoining the separating-chamber 10 is a fan-chamber 12.

Supported in the separating-chamber 10 by brackets 13 is an electric motor 14, the shaft 15 of which carries a fan 16, which operates in the fan-chamber 12. The lower wall of the fan-chamber 12 has a gate 12', which is ordinarily closed, but which may be opened if desired to give access to the interior of the separating and fan chambers.

Communicating with the fan-chamber 12 is a screen-chamber 17, in which is arranged one or more conical screens. In the present embodiment I have shown two conical screens 18 and 19, the former being of coarser mesh and located a short distance in front of the latter screen, which is of a finer mesh. Both screens 18 and 19 have a central passage-way 20. A spout 21 projects down from the screen-chamber and is adapted to discharge the heavier grains of ground coffee which pass through the screen 18, and a similar spout 22 is arranged back of the spout 21 for discharging the finer grains of ground coffee which pass through the screen 19. A pipe 23 is connected with the screen-chamber 17 and communicates with the passage-way 20 of the screen 19.

In operation the coffee passes from the hopper 5 into the mill 4, where it is ground, and then passes down into the passage-way 6, and thence up through the passage 7 and into the separating-chamber 10, being drawn thereinto by the suction produced therein by the fan 16, which is operated by the motor 14. Air enters at the lower end of the passage-way 7 to supply the suction produced by the fan, and the draft of air thus maintained may be regulated by adjusting the slide 8. For example, if the slide 8 is entirely closed the draft through the lower section of the pipe 7 will be the greatest, and practically all of the coffee which enters the passage-way 7 from the passage-way 6 will be drawn up by the strong draft and sucked into the separating-chamber 10. The vortical or centrifugal tendency of the draft within the chamber 10 causes the heavier particles to be thrown outward, while the lighter chaff and dust is drawn by the strong draft directly through the center of the chambers 11 12 and through the passage-way 20 into the pipe 23, being discharged therefrom. The reason for this is that the coffee is subjected to two distinct influences while in the chamber, one influence being the general onward draft through the center of the chamber, and the other is centrifugal force which is produced by imparting a whirling movement to the coffee. In operation the influence of centrifugal force, in the case of the coarser particles, preponderates over the draft influence on account of the greater weight of those particles, the heavier particles being thrown out farther by centrifugal force than the lighter particles, chaff, dust, &c. The lighter particles are not thrown so far out, as the centrifugal force generated by their whirling action is less on account of their lighter weight, and thus they lie closer toward the center, and the influence of the general draft on them preponderates over their centrifugal force. Of course all the particles, coarse and fine, have a general onward movement through the chamber, and, as is evident from the foregoing, the lighter particles take a whirling onward path closer to the center than the heavier particles, which latter have a whirling onward path farther from the center, which drives them onto the screen 18, while the lighter particles pass through the opening 20 at the center of the screen.

All of the coffee except the chaff and dust is thrown against the screen 18 and passes therethrough, the heavier grains being arrested in their flight therethrough and drop down in the passage-way 21, while the lighter grains may have sufficient motion to strike against the screen 19, through which they pass, and their flight being thus reduced they drop into the discharge-spout 22.

Although I have shown two screens, I have found that one screen will probably be sufficient for all purposes, although it may be desirable in some cases to use the extra screen 19.

If it is desired to allow the heaviest grains of ground coffee to discharge out of the passage-way 7, the slide 8 is opened to reduce the draft through the lower section of the passage-way 7, which will allow the heavy material to drop. In such case the lighter coffee will pass up through the passage-way 9 into the separating-chamber and will become separated from the light powder or chaff. The blade 11 in the chamber 10 serves to restrain the rotation of the air adjacent the walls of the chamber 10 and tends to impart a current or draft axially of the fan.

The casing which incloses the chambers 10, 12, and 17 is split horizontally, as shown at 25, the upper part 26 being provided with a handle 27, so that it may be lifted away, leaving all the contained parts easily accessible.

What I claim is—

1. In combination, a mill, a conical separating-chamber provided with an internal radial blade, a vertical passage-way connected with the separating-chamber, a downwardly-directed passage-way leading from the mill to an intermediate point of the vertical passage, means for regulating the admission of air to the vertical passage-way at a point above the junction of the second-named passage-way, a fan-chamber adjoining the separating-chamber, a fan mounted in the fan-chamber, a motor in the separating-chamber for driving the fan, a screen-chamber adjoining the fan-chamber, a conical screen in the screen-chamber and having a central opening, a pipe communicating with the center of the screen-chamber for delivering the chaff therefrom, and a spout discharging the coffee through the wall of the screen-chamber.

2. In combination, a mill, a conical screen with a central opening, means for conveying material from the mill to the screen, a fan in front of the screen for maintaining an onward draft through the central opening of the screen with a vortical action in front of the screen whereby the heavier particles are whirled away from the core of the draft and driven through the screen away from the central opening while the chaff passes through the central opening in the screen.

3. In combination, a mill, a separating-chamber, a plurality of conical screens each with a central opening back of the operating-chamber, a passage-way from the mill to the separating-chamber, means for maintaining an onward draft through said passage-way, separating-chamber and through the openings in the screens, and means for imparting a vortical action to the draft in front of the screens to throw the heavy particles from the center against the screen and allow the chaff to pass through the central opening in the screen.

In testimony whereof I have hereunto set my hand, at Los Angeles, California, this 30th day of March, 1906.

LOUIS GANS.

In presence of—
GEORGE T. HACKLEY,
ARTHUR P. KNIGHT.